No. 749,644. PATENTED JAN. 12, 1904.
J. C. THOM.
PACKING MACHINE FOR PLASTIC MATERIALS.
APPLICATION FILED SEPT. 29, 1903.
NO MODEL. 2 SHEETS—SHEET 1.
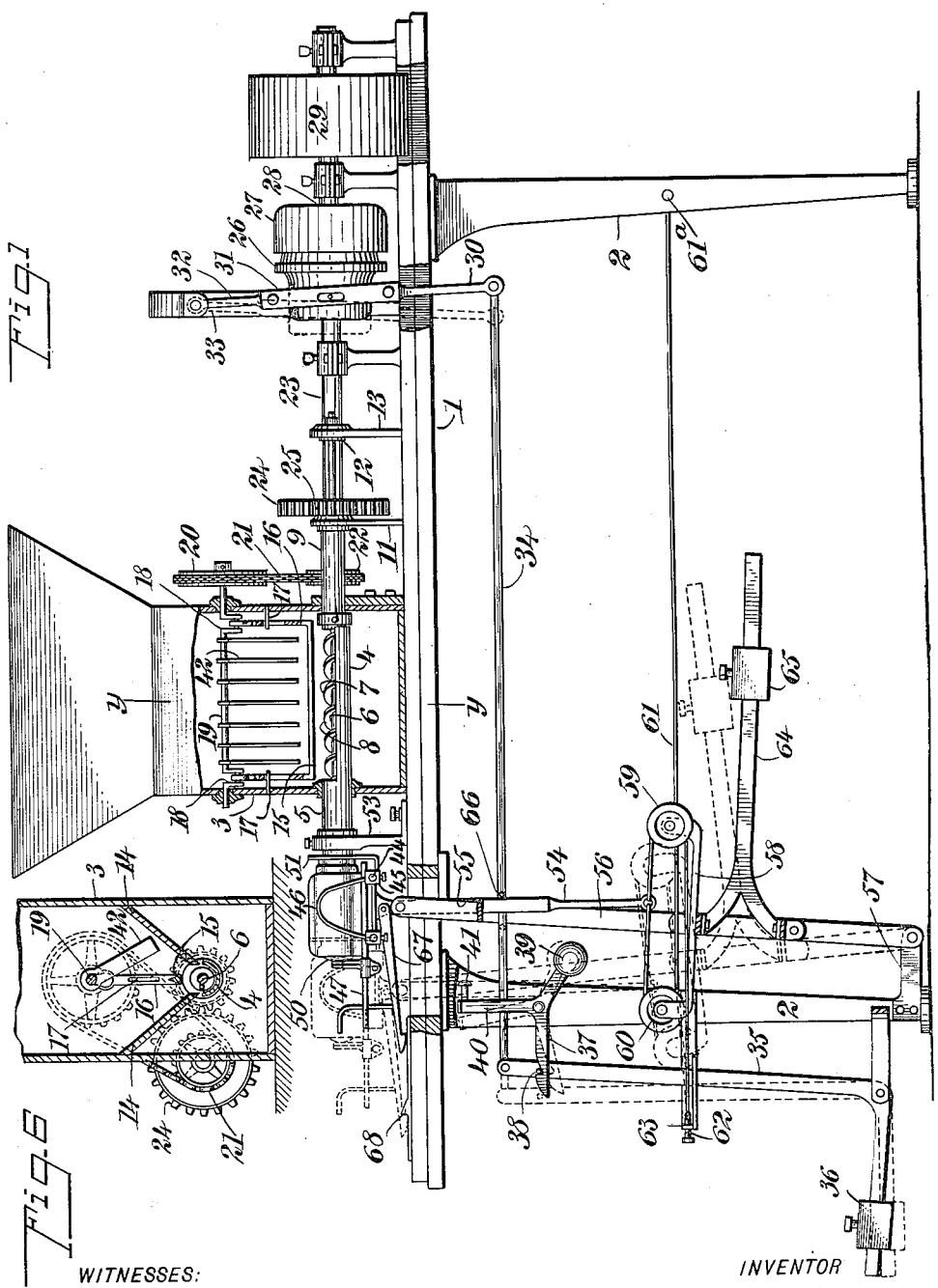
WITNESSES:
J. A. Brophy
C. R. Ferguson
INVENTOR
James C. Thom
BY Munn
ATTORNEYS No. 749,644. PATENTED JAN. 12, 1904.
J. C. THOM.
PACKING MACHINE FOR PLASTIC MATERIALS.
APPLICATION FILED SEPT. 29, 1903.
NO MODEL. 2 SHEETS—SHEET 2.
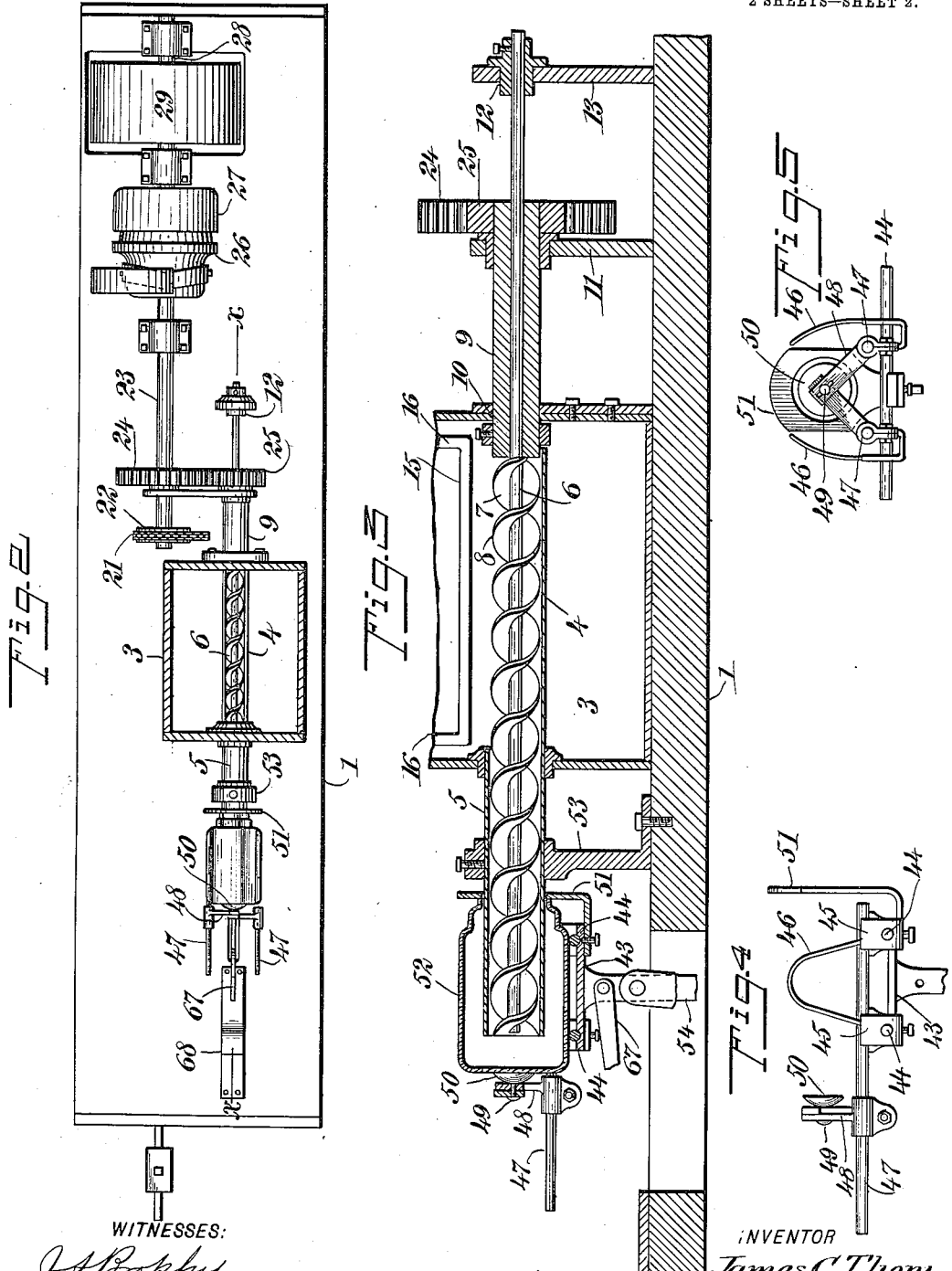
WITNESSES:
INVENTOR
James C. Thom
BY
ATTORNEYS No. 749,644.

Patented January 12, 1904.

UNITED STATES PATENT OFFICE.

JAMES CRAWFORD THOM, OF HELMETTA, NEW JERSEY.

PACKING-MACHINE FOR PLASTIC MATERIALS.

SPECIFICATION forming part of Letters Patent No. 749,644, dated January 12, 1904.

Application filed September 29, 1903. Serial No. 175,024. (No model.)

*To all whom it may concern:*

Be it known that I, JAMES CRAWFORD THOM, a citizen of the United States, and a resident of Helmetta, in the county of Middlesex and State of New Jersey, have invented a new and Improved Packing-Machine for Plastic Material, of which the following is a full, clear, and exact description.

This invention relates to improvements in machines for packing material into jars, bottles, cans, or other receptacles.

In packing plastic or damp material—such, for instance, as snuff—considerable difficulty is found in that the material or a considerable portion thereof adheres to the conveyer and retards the packing, and therefore one object of my invention is to provide a novel form of conveyer by means of which the above-mentioned difficulty is overcome.

Other objects of the invention will appear in the general description.

I will describe a packing-machine for plastic material embodying my invention and then point out the novel features in the appended claims.

Reference is to be had to the accompanying drawings, forming a part of this specification, in which similar characters of reference indicate corresponding parts in all the figures.

Figure 1 is a side elevation, partly in section, of a packing-machine embodying my invention. Fig. 2 is a plan view thereof, partly in section. Fig. 3 is a section on the line *x x* of Fig. 2. Fig. 4 is a side view of a receptacle-carrier employed. Fig. 5 is and end view thereof, and Fig. 6 is a section on the line *y y* of Fig. 1.

The machine comprises a table 1, supported on legs 2. Arranged on the table is a hopper 3, extending through the lower portion of which is a trough 4, which has an outward tubular extension 5, designed to pass into the neck of the packing-receptacle. Operating in the trough 4 and through the tubular portion 5 is a screw conveyer comprising a core 6, on which are two spiral or screw blades 7 8, which rotate on said core. By employing the core and the two blades thereon it is found that the snuff or other plastic material does not adhere to the conveyer or core. The core also extends outward through a tubular shaft 9, and the tubular shaft 9, to which the blades are attached, has a bearing 10 in a side wall of the hopper, and it also has a bearing in a standard 11, while the portion of the core 6 extended outward of the tubular shaft 9 is secured by means of a set-screw in a sleeve 12, supported in a standard 13. In the bottom of the hopper 3, at opposite sides of the trough 4, are plates 14, (see Fig. 6,) which incline downward and inward to said trough. Having vertical movement in the hopper is a packing-bar 15, designed to pack material into the trough around the conveyer. This packing-bar 15 has upwardly-extended arms 16 at its ends, these arms being slotted to receive pins 17, extended from the side walls of the hopper and forming guides for the vertical movements of the bar. The upper ends of these arms 16 are attached to the cranks 18 on a crank-shaft 19, which, as here shown, is provided at one outer end with a sprocket-wheel 20, from which a chain 21 extends to a sprocket-pinion 22 on a driving-shaft 23, and on this driving-shaft is a gear-wheel 24, meshing with a pinion 25 on the tubular shaft 9 and through the medium of which the conveyer is rotated.

Movable lengthwise on the shaft 23, but designed to rotate therewith, is a clutch member 26 for engaging with a clutch member 27 on a counter-shaft 28, provided with a driving-pulley 29. The clutch is shown as a friction-clutch; but obviously any other form of clutch may be employed. The clutch member 26 is moved into and out of engagement with the clutch member 27 by means of a lever 30, having a ring portion 31 engaging around the clutch member 26 and attached to a ring arranged in an annular channel formed in said clutch member, and from the upper portion of the ring 31 an arm 32 extends to a swinging connection with an upright 33. From the lever 30 an operating-rod 34 extends along the under side of the table 1 and connects with the upper end of the vertically-disposed member of an angle-lever 35, and on the horizontally-disposed portion of this angle-lever is an adjustable weight 36, which is designed to operate the lever 30 to release the clutch member 26 from the member 27. When the clutch members are in engagement one with the other, however, the levers are prevented from movement by means of a swinging latch 37, having a notch to receive a pin 38 on the upwardly-extended portion of the lever 35, and at the side opposite the notch the lever has an extended arm provided with a weight 39, and extended upward from the latch is an arm 40, from which a lug 41 extends outward, the object of which will hereinafter appear.

On the crank-shaft 19 are stirrer-fingers 42, which will agitate the snuff or other material in the hopper, permitting it to move freely into the trough 4.

I will now describe the means for operating and carrying the receptacle in which the snuff or other material is to be packed. This carrier consists of a plate 43, supporting cross-rods 44, adjustable on which at opposite sides of the plate are upwardly-extended plates 45, the plates of a side being connected by a spring-yielding loop 46, designed to engage against the side of the receptacle. Attached to the plates 45 and extended lengthwise of the machine are rods 47, on which levers 48 are mounted to swing. These levers 48 are inclined upward and inward and at their meeting-points are slotted to receive a clamping-pin 49, engaging with a plate 50, designed to engage against the bottom end of the receptacle 52, as clearly shown in the drawings. At the opposite end of the plate 43 is an upwardly-extended plate 51, having an opening corresponding in size substantially to that of the mouth of the receptacle 52 and permitting the tubular extension 5 to pass freely through it. It will be noted that this tubular extension rearward of the plate 51 is supported in a standard 53. The jar or receptacle is placed in the carrier between the opposite loops 46, with its mouth end against the plate 51, and then the clamp or plate 50 is to be brought into position and secured. In its movements the carrier must at all times move in a horizontal plane or in parallelism with the top of the table 1. To cause such movement, an arm 54 extends downward from the plate 43 through an opening in the table 1, and the said arm 54, near the plate 43, is pivotally connected to the lever members 55 56, which at their lower ends are mounted to swing on brackets 57. These lever members 55 56 are suitably spaced apart to permit the arm 54 to swing between them, and carried by a horizontally-disposed bar 58, attached to said lever members, are pulleys 59 60, around which a cord or cable 61 passes. The lower end of the arm 54 is attached to said cord or cable in its upper stretch between the pulleys 59 60. One end of the cord or cable is attached to a cross-rod 61ª, (see Fig. 1,) while the other end is attached to an adjusting-screw 62, arranged in a fixed support 63. By this arrangement it will be seen that as the lever members 55 56 swing necessarily in the arc of a circle the arm 54 will at all times be held in a perpendicular line, and thus the carrier will move in a horizontal plane. Extended rearward from the lever members 55 56 is an arm 64, on which a weight 65 is adjustable. On the rod 34 at the rear side of the arm 54 is a pin 66, designed to be engaged by said arm to shift the clutch member 26 into operative position, and pivotally connected to the arm 54 above its connection with the lever members 55 56 is a forwardly-extended latch 67, designed to engage with a lug 68 on the table-top and hold the carrier in its outermost position while removing a packed receptacle or placing an empty one in position.

In the operation when the parts are in the position shown in Fig. 1 upon setting the machine in motion the conveyer will carry the snuff or other material into the receptacle 52 and cause it to firmly pack therein. As the feeding continues the carrier, with the receptacle, will be forced outward until the receptacle is completely filled. At this time the latch 67 will engage with the lug 68, holding the carrier in its outer position, as before mentioned. Just before such engagement of the latch with the lug the arm 54 by engaging with the lug 41 will swing the latch 37 out of engagement with the pin 38, so that through the medium of the weight 36 the lever 35 will be swung, drawing the rod 34 forward, consequently releasing the clutch member 26 from the clutch member 27, thus stopping all parts of the machine excepting the shaft 28. After placing the empty receptacle in the carrier the latch 67 is to be released from the lug 68, and then the weight 65 will cause the carrier to be moved to packing position. During this movement the arm 54 by engaging with the pin 66 will push the rod 34, causing an engagement of the clutch members 26 27, thus setting the machine in operation. As the rod 34 is thus moved the pin 38 by engaging the curved upper edge of the latch 37 will swing the latch downward, permitting the pin to pass into the notch formed in the latch. The said latch of course will be swung upward by the weight 39.

Having thus described my invention, I claim as new and desire to secure by Letters Patent—

1. A packing-machine comprising a hopper, a trough extended through said hopper and having a tubular extension, and a conveyer mounted to rotate in said trough and extension, the said conveyer comprising a core and a plurality of spiral blades rotatable thereon.

2. In a packing-machine, a hopper, a trough extended through said hopper, a tubular extension for the trough, a spiral conveyer arranged to rotate in the trough and extension, a vertically-reciprocating packing-bar in the hopper above the trough, and stirrers in the hopper.

3. A packing-machine comprising a hopper, a trough extended through the lower portion of the hopper, a tubular extension outward from said trough, a spiral conveyer arranged to rotate in the trough and said extension, a crank-shaft in the hopper and having two cranks, a packing-bar, arms extended upward from said packing-bar and connected with the cranks, guide devices for said arms, and stirrers attached to the crank-shaft.

4. In a packing-machine, a hopper, a trough extended through the hopper, a tubular extension for said trough, a tubular shaft, a conveyer comprising a fixed core having a portion extended through said tubular shaft, and a pair of spiral blades mounted to rotate on said core, and a carrier for a receptacle to be filled.

5. A packing-machine comprising a receiving-trough, a tubular extension therefrom, a conveyer arranged to rotate in the trough and in said extension, a receptacle-carrier, clamping devices thereon, a swinging lever to which the carrier is pivoted, and means for holding the carrier on a horizontal plane during its movements.

6. A packing-machine comprising a receiving-trough for material, a tubular extension from said trough, a spiral conveyer mounted to rotate in said trough and extension, a receptacle-carrier, an arm extended downward from said carrier, lever members with which said arm has pivotal connection, pulleys carried by said lever members at opposite sides, and a cord or cable attached at its ends to fixed devices and extending around said pulleys, the upper stretch of the cable having connection with the arm depending from the carrier.

7. A packing-machine, comprising a feeding mechanism, a receptacle-carrier, a weighted swinging lever to which the carrier is pivotally connected, means for holding the carrier in parallelism with the bed or table of the machine, and a locking device attached to the carrier.

8. In a machine of the class described, the combination with a feeding mechanism, of a receptacle-carrier, comprising a plate, cross-rods on said plate, clamping-jaws adjustable on said rods for engaging with the sides of the receptacle, rods extended lengthwise of the plate, a clamping-plate supported by said rods, and an upwardly-extended plate attached to the end of the first-named plate and provided with an opening.

9. In a packing-machine, a hopper, a trough extended through the hopper, a tubular extension from said trough, a spiral conveyer arranged in the trough and extension, a driving-shaft having gear connection with said conveyer, a pulley-shaft, clutch members respectively on the said shafts, one of said members being movable lengthwise of its shaft, a receptacle-carrier, and means operated by the movements of said carrier for shifting the said movable clutch members.

10. In a packing-machine, a hopper, a trough extended through the lower portion of the hopper, a tubular extension from said trough, a spiral conveyer operating in the trough and extension, a vertically-movable packing-bar in the hopper, a crank-shaft carrying said bar, agitators secured to the shaft, a driving-shaft, driving connection between said crank-shaft and driving-shaft, and driving connections between said driving-shaft and the said conveyer.

In testimony whereof I have signed my name to this specification in the presence of two subscribing witnesses.

JAMES CRAWFORD THOM.

Witnesses:
FRANK L. DAVISON,
H. C. STONAKER.